TOLL TICKETING TELEPHONE SYSTEM

Filed Dec. 16, 1963

INVENTORS:
T.P. MILLER
R.H. DUNCAN
J.D. SOPINSKI

BY Phillip A. Weiss
Atty

TOLL TICKETING TELEPHONE SYSTEM

Filed Dec. 16, 1963 3 Sheets-Sheet 3

United States Patent Office 3,394,229

Patented July 23, 1968

3,394,229

TOLL TICKETING TELEPHONE SYSTEM

Thomas Paul Miller, Robert Hudson Duncan, and James Daniel Sopinski, Chicago, Ill., assignors to International Telephone and Telegraph Corporation, New York, N.Y., a corporation of Delaware Filed Dec. 16, 1963, Ser. No. 330,754
9 Claims. (Cl. 179—7.1)

ABSTRACT OF THE DISCLOSURE

An automatic toll ticketing system capable of automatically serving person-to-person, collect and special service calls. The system includes a voice recording giving calling instructions and a temporary recorder for temporarily storing voices received over the calling line from the time the line moves into an off-hook condition until the special service call is established. A permanent recorder connects to a plurality of said temporary recorders for permanently recording the information from said recording when the call contains questionable billing information.

This invention relates to automatic toll ticketing telephone systems and more particularly, to systems for minimizing the use of manual services in connecting and billing credit card, third number, person-to-person prepaid, collect, and special service calls (generally termed PPCS calls).

Originally, all telephone calls were completed manually by an operator. However, the trend toward automation of telephone switching began very early after the invention of the telephone. Thus, dials and automatic switching equipment soon replaced operators who were no longer required to complete most types of calls including long distance or toll calls. For example, a calling party wishing to complete a station-to-station, long distance toll call now can establish such a call by dialing a three digit area code, a seven digit called number and sometimes a calling line or party identifying number which may also include as many as seven digits. Responsive thereto automatic equipment prints a bill or makes other suitable records to charge the calling party for the call.

For a long time, the PPCS type of call remained an exception to the complete automation of toll calls. Originally, to make a toll call, a calling party had to call an operator who placed the call, challenged the called party, and made a toll ticket if the call was accepted. After the introduction of automatic toll ticketing equipment, it was still necessary during a PPCS call to switch the calling subscriber to the operator who supervised the call, as before. This supervision was deemed necessary since no manipulation of a dial will prove that a called person has actually answered a person-to-person call. Nor will it prove that a called person will accept reversed charges. Thus, it was difficult to provide an adequate and practical way to eliminate PPCS operators.

This need for human operators to complete PPCS calls has economic effects which reach far beyond the needs of PPCS calls, per se. Thus, if a small office requires an operator to complete these PPCS calls, it is sometimes uneconomical to install automatic toll ticketing equipment to handle other calls. Instead, it is better to let the PPCS operator complete all toll calls. On the other hand, if an operating company installs automatic toll ticketing equipment and eliminates the PPCS operator, it may be necessary to route all PPCS calls through other offices owned by another operating company which does provide PPCS operators. One result has been a devastating loss of revenue for the small company. More particularly, in the U.S., all telephone toll charges are divided into A, B, and C commissions. The A commission is paid to the operating company that owns a calling subscriber line from which a toll call is made. The B commission is paid to the operating company that makes the toll ticket for such a call. The C commission is paid to the long lines company that hauls the call. The small company needs to capture the B commissions to survive; to capture this B commission it must provide PPCS service.

To eliminate the operators in the PPCS calls, voice signal recorders are sometimes used to give the calling party complete control over the toll ticketing apparatus while giving the telephone company a reliable means of ticketing the call and billing the party to be charged. More particularly, some known systems use tape recorders to monitor the human voice during the calls which formerly required operator handling. This voice recording is in addition to the well known data recorders which automatic ticketing equipment conventionally use. The voice tapes are screened before billing and correlated with the printed tickets. Where so indicated by the voice tape, additional charges are entered against particular subscribers, as for example where meaningful information was exchanged during a call before a called subscriber rejected collect call. However, monitoring the voice tape on most of the calls is wasteful of time since the proper charges are already ticketed. In addition, the method of correlation of the tape and the tickets necessitates the expenditure of personnel time and of equipment.

Accordingly, it is an object of the present invention to provide new and unique automatic toll ticketing systems. In particular, an object is to provide systems for automatically ticketing without the necessity of operator intervention in toll calls and especially in PPCS calls. In this connection, an object is to provide equipment to give a calling subscriber complete control over toll ticketing apparatus which enables the calling subscriber to challenge a called party without requiring the services of an operator and which allows the telephone company to reliably check the automatic billing of the call with a minimum expenditure of time and equipment.

Another object of this invention is to provide equipment for making temporary voice recordings required for ticketing all PPCS calls. A related object of this invention is to provide equipment for transferring to a permanent voice recording only those calls entered on the temporary recording where there is a question as to whether or not the call is billable.

Yet another object of this invention is to provide an additional printed or perforated memo for every call wherein the billable information is recorded on the permanent tape. Here an object is to facilitate a quick and easy comparison between the voice recorders and bills which are sent to the customers.

Still another object of this invention is to provide an automatic toll ticketing system wherein outpulsing commences on completion of in dialing for station-to-station prepaid calls. On all other classes of calls means are provided whereby outpulsing can be delayed for varying time periods, as required by the voice recording equipment.

In accordance with one aspect of this invention, an automatic toll ticketing system is provided with equipment for automatically completing and billing PPCS calls. The equipment comprises an announcer optionally using recorded announcements for instructing the calling party on the proper procedure for completing the various types of PPCS calls. A temporary voice recorder makes a record of the PPCS calls from initiation up to the time of the start of the billable portion of the call. This voice recording is transferred to common recorder means for providing a permanent audio recording of the voice part of the call only if there is a question as to whether the call is billable. For example, during all credit card calls, third number calls, and calls wherein the second calls of call digit is not dialed within a predetermined and optionally selected time period, the temporary voice recordings are transferred to the common recorder. Also, billing memos are printed on a one-for-one basis with the audio records transferred to the common recorder. This billing memo is in addition to the toll ticket normally printed under the control of the ticketer.

The above mentioned and other features and objects of this invention and the manner of obtaining them will become more apparent and the invention itself will be best understood by reference to the following description of an embodiment of the invention taken in conjunction with the accompanying drawings, in which.

Figure 1:
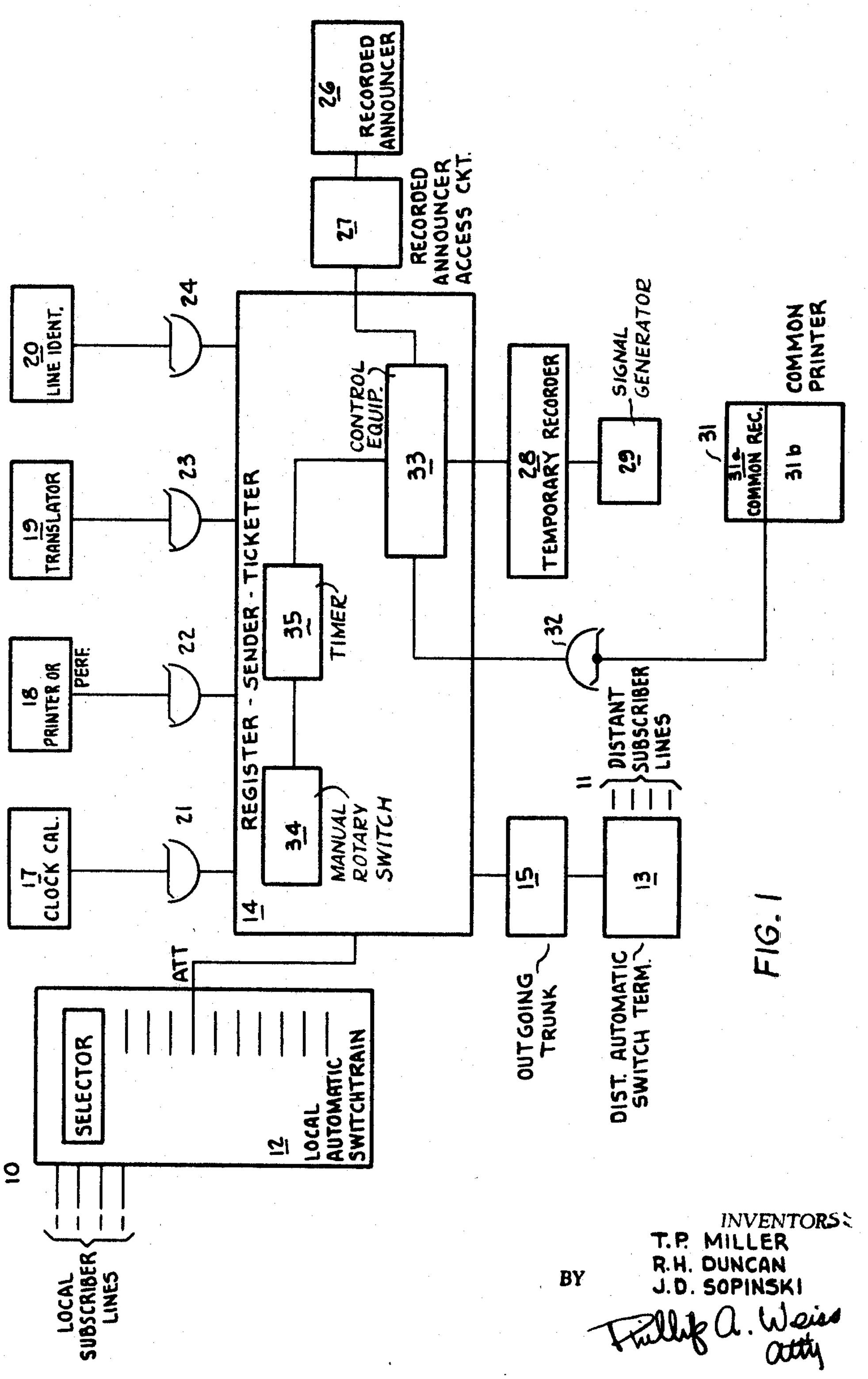
FIG. 1 illustrates in block diagram form, an automatic toll ticketing system embodying the invention.

The drawing of FIG. 1 shows an automatic toll ticketing system which includes local and distant subscriber lines 10, 11 respectively. The local and distant lines are associated with local and distant automatic switch trains 12, 13. An automatic toll ticketing, register-sender-ticketer 14 couples the local train 12 to the distant train 13 through an outgoing trunk 15.

If a subscriber served by local lines 10 dials a number :hat identified a local called line, the local train 12 seizes and signals that called line. If, on the other hand, a ocal subscriber dials a number that identifies a distant :alled line 11, the local switch train 12 seizes the automatic oll ticketing equipment through register-sender-ticketer 14. This seizure is accomplished via an automatic toll icketing point of access, ATT. After extracting the infor-nation data required to complete a toll ticket, register-ender-ticketer 14 causes the call to be extended via the outgoing trunk 15 and the distant switch train 13 to dis-ant called line 11.

The register-sender-ticketer 14 is equipped to be associ-ated with such well known equipment as a clock calendar 17, a printer or perforator control 18, a translator 19, and a line identifier 20. These items may be accessed to he register-sender-ticketer equipment 14 through any uitable access means such as switches 21, 22, 23 and 24 espectively.

It should be understood that the register-sender-ticketer 14 is shown as a single piece of equipment solely to acilitate an explanation of the invention. Any well known, eparate register-sender and ticketer combinations could e used. For an example of a register-sender and ticketer ombination which could be used, reference may be made o an application entitled "Automatic Toll Ticketing Sys-em" invented by J. M. Blackhall, Ser. No. 51,742, filed n Aug. 24, 1960, and assigned to the assignee of this ivention.

The information used in making a toll ticket is derived rimarily from dial pulses sent by a calling subscriber ver a local line in group 10. The information is also enerated by the associated common equipment, such as he clock calendar 17 which inserts time and date informa-on into the ticketer. The line identifier 20 may be used o supply the ticketer with digital information identifying he calling line. The translator 19 may be used to convert nformation stored in the register from one coded form nto another. The printer or perforator control 18 is used fter the call is completed to make the toll ticket from the nformation stored in the ticketer.

Equipment of the type described thus far is somewhat ypical of similar equipment found in one form or another in most automatic toll ticketing equipment wherein operators manually service PPCS calls. In systems equipped to handle PPCS calls without operator intervention, additional equipment is usually furnished. For example, to instruct the calling party on the proper dialing procedure, common equipment (such as recorded announcement equipment 26) is coupled to the calling line 10 through the register-sender-ticketer 14 and recorded announcement access circuit 27. Also coupled to the calling line through the register-sender-ticketer 14 is voice recording equipment 28 and its associated beep signal generator 29 used to notify the calling subscriber that a voice recording is being made. Equipments 28, 29 are connected to the register-sender-ticketer 14 on a one-to-one basis. The recording unit 28 records all voice signals and other signal conditions occurring on a line during a PPCS call up to the time when the billable portion of the call begins. While this device 28 may take any suitable form, the invention contemplates the use of a magnetic tape recorder having a rewind speed that is at least three times as fast as its record speed.

According to the invention, the voice recorder 28 makes temporary voice recordings during the initial portion of each PPCS call. The term "initial portion" means the period of time extending from the seizure of the toll ticketing equipment until the time when the subscribers decide to accept the call. That is, for example, the time when the called person answers on a person-to-person call or when a called subscriber decides to accept a collect call. Then, the temporary tape recorder 28 is disconnected from the line responsive to a coded release signal sent over the line. For example, the calling subscriber dials a predetermined digit. A timer is used to automatically release the PPCS call if the coded release signal is not received within a fixed time period.

The recorded announcement circuit 26 has a number of recorded messages giving instructions for completing different types of PPCS calls. In one particular exemplary circuit, five pre-recorded messages are provided. The access circuit 27 selects and causes play back of one of these pre-recorded messages responsive to a coded class-of-service prefix digit which the calling subscriber transmits. After the pre-recorded message is played back, the recorded announcement circuit 26 is immediately released so that it will be ready to serve another PPCS call.

The invention contemplates provision of means in access circuit 27 for cutting off the announcer if the subscriber proceeds immediately to follow the required PPCS procedures. The invention also contemplates provision of means in the access circuit 27 for completely eliminating the play back of the announcement circuit 26. In the latter event, subscribers receive their instructions from a directory. For instance, tthe announcer 26 is particularly useful in areas where subscribers are not familiar with the routine for placing PPCS calls. Thus, recorded instructions are extremely helpful immediately after a PPCS system is installed and in rural areas where PPCS calls are not too common. On the other hand, in large metropolitan areas where a subscriber may originate many PPCS calls every day, the subscriber might object to listening to repeated play back of the same recorded messages.

Means (indicated by the rectangles located in the equipment 14, common recorder and printer equipment indicated by rectangles 31, and common recorded access switch 32) are provided to preclude the necessity of correlating the tickets and the voice recordings and the necessity of listening to all of the material recorded on the temporary tapes to determine the additional billings. The rectangles in equipment 14 include recorder control circuitry 33, manual rotary switch 34, and timer 35.

In all calls except station-to-station prepaid, the temporary recorder 28 records all voice signals up to the time when the billable conversation commences. This recorded temporary message is re-recorded on a common recorder 31 when the billing information supplied to the ticketer is ambiguous. For example, if there is an unnecessary delay in dialing a second class of call digit which accepts charges, the voice recording on the temporary tape is re-recorded in the common recorder 31. The calling subscriber is instructed to dial this digit when satisfied that a billable call has been completed.

According to another aspect of this invention, each of the register-sender-ticketers 14 is equipped with a switch (such as the manual rotary switch 34) which is used to select the time interval within which the second-class of call or final charge acceptance class digit must be dialed. Timer 35 measures the time interval. If the second-class of call digit is not dialed within the allotted time interval, all station-to-station collect, person-to-person prepaid, and person-to-person collect calls are re-recorded on the common recorder 31.

In operation, switch 34 may be manually positioned to any of a plurality of different positions. Each position of the switch represents a different time interval. In this inventive system described herein the interval can be varied for 0 to 168 seconds.

Control equipment 33 is provided to control the interconnection of the temporary recorder 28 and the common recorder 31. The equipment 33 provides means for operating the temporary recorder 28 during all PPCS calls. During station-to-station, prepaid calls, when no recording is necessary, recorder 28 does not operate. On all credit card and third number calls the temporary recorder 28 starts immediately upon the completion of the recorded announcement in order to record a subscriber speaking the credit card number or the third number. On station-to-station credit card and third number calls recorder 28 is automatically disconnected from the circuit after ten seconds. On person-to-person credit card and third number calls the recorder remains connected in the circuit until the final class digit is dialed to accept charges. This is to assure that the calling party has reached the desired person at the called station. On station-to-station collect, person-to-person prepaid and collect calls, recorder 28 is operated on the receipt of answer supervision. The recorder 28 is removed from the circuit on the receipt of the final class digit.

After the call is over and the parties hang-up, the temporary recorder 28 automatically rewinds. The common recorder is then connected to the temporary recorder under the following conditions:

(1) The final class digit is not received in the allotted time.

(2) All credit card and third number calls except station-to-station calls where the calling party hangs-up within six seconds after return of answer supervision.

Figure 2:
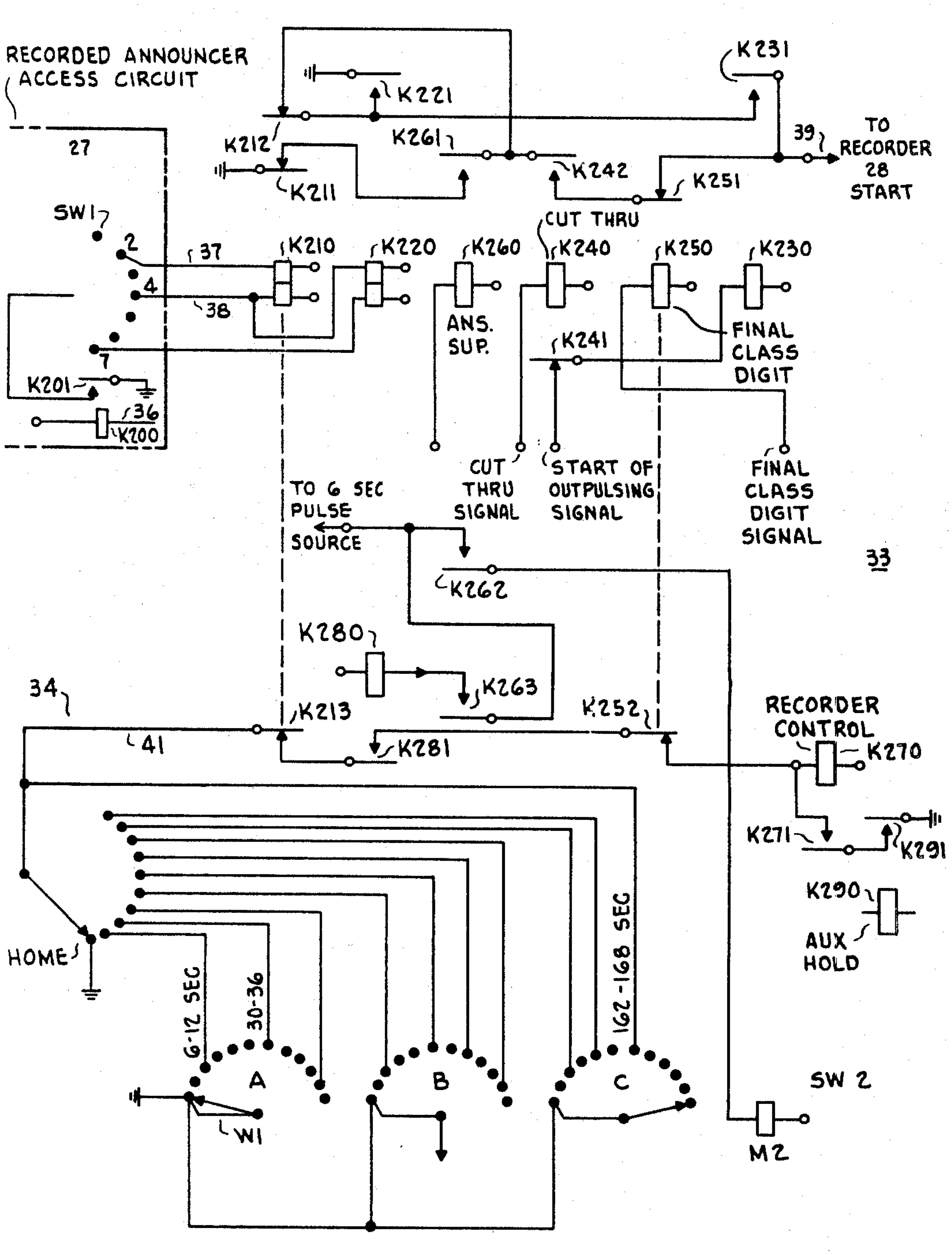
FIG. 2 illustrates in schematic form those portions of a voice recorder control circuitry of the automatic toll ticketing system necessary for an understanding of the operation of the inventive system.
Figure 3:
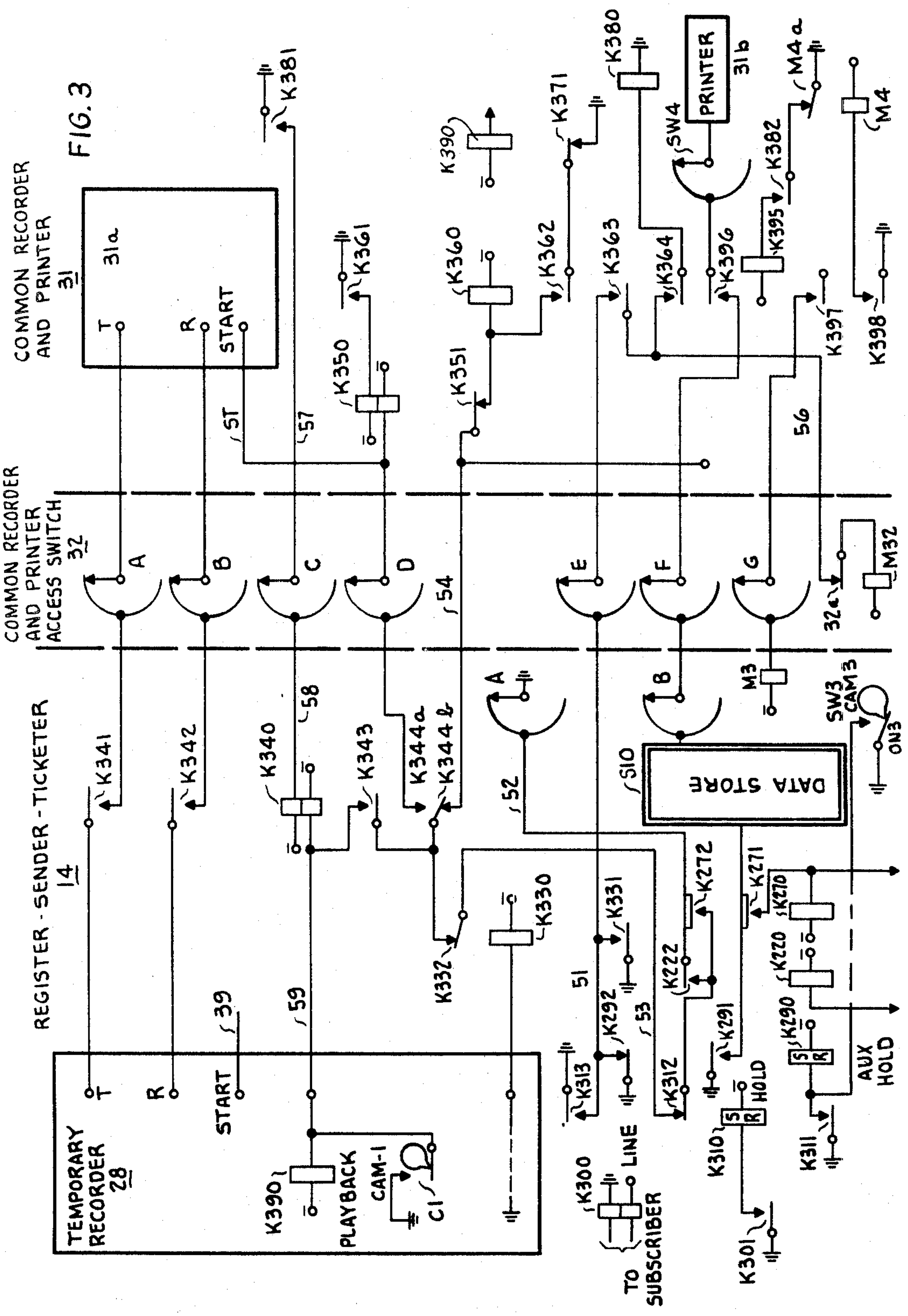
FIG. 3 illustrates in schematic form the portions of the circuit necessary to understand the connections and conjunctive operation of the temporary recorder and common printer and recorder.

A more detailed drawing of the essential parts of the circuitry necessary to comprehend the invention is found in FIGS. 2 and 3.

FIGURE 2 shows that portion of the circuitry in the register 14 which is also shown in FIG. 1 by means of a rectangle 33 and rectangles 34 and 35. FIG. 2 also shows one level of a switch SW1 which is located in the recorded announcement access circuit shown in FIG. 1 at 27.

Means are provided for controlling the recording of voice signals in the temporary recorder 28. More specifically, at the end of the recorded announcement, a signal from the recorded announcement circuit is transmitted over conductor 36 to operate relay K200. Responsive to the operation of the relay K200, normally open contacts K201 close to extend ground to a level of a rotary switch SW1 in the recorded announcement access circuit 27. The rotary switch SW1 has been previously positioned responsive to the receipt of a prefix digit which identifies the type of call that is in progress.

In station-to-station, prepaid calls, the rotary switch SW1 is in position 2 and thus ground is extended from contacts K201 through the top coil of relay K210, thus operating that relay. Responsive to the operation of relay K210, an operating ground is removed at contacts K211 which are now open. A ground extending circuit is also opened at contacts K212. This opening of these two sets of contacts prevents the activation of the temporary recorder 28 when there is a station-to-station, prepaid call.

In station-to-station, credit card calls the switch SW1 is in position 4, and a ground is extended through contacts K201, position 4 of switch SW1, the lower winding of relay K210, and the upper winding of relay K220 (in parallel) to negative battery. Both of the relays K210 and K220 operate.

The operation of relay K210 opens contacts K211 and K212. However, the operation of relay K220 closes contacts K221 to apply a ground for preparing to operate the temporary recorder 28. This ground has no immediate effect at this time because contacts K212 and K231 are now open. At the start of register outpulsing, relay K230 operates through the normally closed contacts K241 of cut-through relay K240. When relay K230 operates at the start of sending, contacts K231 close to extend the temporary recorder operating ground over conductor 39 to start the temporary recorder. On the completion of the outpulsing, relay K240 operates to break the operating circuit of relay K230 by opening contacts K241. When relay K230 releases, the contacts K231 open to release the recorder. Approximately ten seconds have elapsed since the recorder began to operate; this is enough time to record the credit card number while the sender is outpulsing. Contacts K242 close with no effect at this time.

In person-to-person, credit card and third number calls, the switch SW1 of circuit 27 is on position 7. A ground is extended from contacts K201 through the switch SW1 and the lower coil of relay K220 for operating that relay. (Note that relay K210 does not operate this time.) Responsive to the operation of relay K220, contacts K221 close to prepare an operating ground circuit for starting the temporary recorder 28. This ground circuit is extended to the temporary recorder 28 through contacts K231 when they are closed by relay K230 operating responsive to the initiation of outpulsing. This time we do not want to drop the recording in ten seconds because more information must be recorded when the called subscriber answers.

Means are provided for maintaining the circuit to operate the temporary recorder 28 after cut-through and answer during the establishment of person-to-person credit card or third number calls. In greater detail, relay K230 returns to normal when its operating circuit is opened at contacts K241 responsive to the operation of relay K240 at cut-through. Thus, contacts K231 open; however, the operating ground for the temporary recorder 28 now extends from contacts K221 through contacts K212, K242, and K251 to conductor 39.

Means (such as relay K250) are provided for disconnecting the temporary recorder 28 from the circuit responsive to the dialing of the final class digit. This digit is sent by the calling subscriber to accept charges after the proper party has been reached. Thus, when the final class digit is received relay K250 operates to open contacts K251 and break the ground circuit that held the temporary recorder 28. At that time, the voice recording is terminated, the beep signal disappears, and the subscribers have a private conversation.

Means are provided for connecting the temporary recorder to the call connection during station-to-station and person-to-person collect calls, and during person-to-person prepaid calls. For those types of calls neither of the relays K210 nor K220 are operated since the switch SW1 of circuit 27 is on positions other than positions 2, 4 or 7. Relay K240 operates on cut-through. When the called subscriber answers, the answer supervision relay K260 operates from ground through contacts K211, K261, K242, K251 to conductor 39 that connects to the temporary recorder 28. Then, an operating ground circuit is extended to the temporary recorder 28. This operating ground circuit is opened at contacts K251 responsive to the operation of relay K250 when the calling subscriber dials the final class digit. Again, this disconnects the recorder 28 and give privacy to the call.

After the call is completed to the called subscriber and the calling or called subscribers are willing to accept charges, the calling subscriber dials a final class digit. Then, the temporary recorder 28 is disconnected from the circuit and immediately rewound to its start position. Upon the completion of a call, the temporary recorder 28 is connected to the common recorder 31*a* if there is any question regarding the adequacy of billing information which was received from the calling subscriber.

In greater detail, means (such as relay K270) are provided for operating the common recorder and printer 31 to transfer the temporary voice recording into permanent storage. Relay K270 is operated responsive to the receipt of a ground potential obtained from a manual rotary switch 34 located on the register-sender-ticketer 14. This switch makes it possible for the operating company which owns the toll ticketing system to adjust the length of a time period which extends from the receipt of answer supervision to the time when a calling subscriber must have dialed the final class digit. This length of time can be varied for each register individually from 0 seconds to 168 seconds. The exact duration of this time period is established by the operating company as a matter of business practice. The manual rotary switch 34 operates in conjunction with a timer 35. The timer can be a rotary or minor switch (such as switch SW2) wherein the operating magnet M2 is connected to a source of six second pulses through contacts K262 on the answer supervision relay K260.

As can be seen in FIG. 2, if switch 34 is set on its home position, the time pulse switch SW2 is not used. Instead, a ground potential is applied continuously to a conductor 41. This ground is transmitted over a circuit extending from ground through the HOME position of the switch 34; the wiper, conductor 41, and normally closed contacts K213 of relay 210 to open contacts K281.

A billing relay K280 operates six seconds after answer supervision (i.e. when contacts K263 close) to operate contacts K281 and extend the ground on conductor 41 through contacts K252 and the coil of the recorder control relay K270 to battery. Relay K270 is thereafter locked operated through contacts K271 and contacts K291 on an auxiliary hold relay K290. The operation of relay K290 will be explained in greater detail in relation to FIG. 3. If there is a station-to-station, prepaid call, relay K210 operates and opens contacts K213 to preclude this connection and operation of the common recorder. If there is no answer or if the circuit is dropped prior to the end of the six second period after the receipt of answer supervision, the common recorder 31*a* is not connected to receive a transferred voice recording because relay K280 will not yet have operated.

If the relay K250 is operated when the auxiliary hold relay is not operated, the common recorder control relay K270 returns to normal when its operating circuit is opened at contacts K252 by the receipt of the final class digit. If the relay K290 is already operated, the relay K270 locks operated.

When the manual rotary switch 34 is set at any position other than its home position, the ground applied to conductor 41 via the wiper of switch 34 is derived from the timing switch SW2. The timing switch SW2 is driven one step every six seconds responsive to the output of a six second timer which is connected to magnet M2 through contacts K262 on relay K260. Since relay K260 operates responsive to answer supervision, the switch SW2 measures a time period which begins with answer supervision. Accordingly, depending upon the portion of the six second pulse source cycle which is present when answer supervision is received, the wiper W1 of level A reaches the first contact in the bank sometime between 0 and 6 seconds. In a similar manner, the wipers of all other levels connect ground to the first contact in the bank B and C at a time increment which may vary from 0–6 seconds. The contact banks of switch SW2 are connected to the contacts in the bank of manual switch 34. Thus, we can vary the time period extending between the receipt of answer supervision and the time when ground is extended to conductor 41 by setting the manually controlled wiper of switch 34 on a particular contact. This period can be varied in six second increments from 0 to 168 seconds.

It should be remembered that the ground potential on conductor 41 is employed to operate relay K270 if the final class digit relay K250 has not been operated (i.e. if the calling subscriber has not indicated that the toll charges would be accepted.) In this manner, the operating company can adjust the time within which the calling subscriber must dial the final class digit or have a voice recording of his call permanently recorded. Consequently, if he does not dial this digit, his voice recording may be monitored and he may be billed for the call if it was in fact completed.

A particular feature of the invention is that every manual switch may be put at a different setting. Since the calling subscriber can never be sure that he knows what time period is set on the particular register that is serving his call, he will not likely attempt to communicate fraudulently delaying the dialing of the final class digit. In other words, if the calling subscriber knows that the timer will not transfer the voice recording into permanent storage for a period of two minutes, he might talk for a period of, say one minute and fifty seconds; then, he would dial his final class digit and have almost two minutes of free time. We remove this opportunity for fraud by providing a variable time period. This way a consistent cheater will be discovered.

The effect of the operation of relay K270 and the means for interconnecting the two recorders 28, 31*a* are best illustrated in FIG. 3. Therein is shown portions of the first or temporary recorder 28, ticketer-register-sender 14, printer and common recorder access circuit 32, and a portion of common recorder 31 and printer 31*b* respectively. The printer 31*b* is associated with the common recorder 31*a* to provide means for automatically printing a billing means for every voice recording permanently stored in the common recorder 31. This memo is in addition to and a duplicate of the regular toll ticket. Thus, there is no need to vary the normal routine of printing and sending toll tickets unless a comparison of the memo and voice recording indicates that an improper charge has been made.

Means (not shown) may be provided for indexing the billing memo to properly identify it as being the charges associated with a particular one of the permanent stored voice recordings. This identification means may result in a printing of an identifying number from one to five on each ticket and recording a series of like number tone signal pulses on the voice recording tape.

The controls in the register-sender-translator circuit 14 include a line relay K300, a hold relay K310, and an auxiliary hold relay K290, all of which are well known to those skilled in the art of automatic telephony.

Relay K300 is used to detect the off-hook condition of a calling subscriber station connected to the register-sender-ticketer 14. In a well known manner, the operation of relay K300 closes normally open contacts K301 to energize the slow-to-release hold relay K310. The well known auxiliary hold relay K290 is controlled by the hold relay K310 over contacts K311.

The operation of hold relay K310 also opens contacts K312 and closes contacts K313. The opening of contacts K312 opens a ground path with no immediate effect. The closing of contacts K313 places another ground on an already grounded conductor 51 that connects to a contact on a level of switch 32. This ground steps the access switch 32 over a circuit traced from ground on contacts K313, conductor 51, a terminal on switch 32, contacts K363, 32*a* and the winding of the motor magnet M32 of the switch 32. The switch 32 is thus designed to hunt for an absence of ground. Since this terminal is grounded, the switch can not stop here. This prevents the seizure of a common recorder while the hold relay K310 is operated.

Responsive to the operation of relay K290 contacts K291 close to prepare a holding ground circuit for relay K270. This operation is also shown in FIG. 2. Contacts K292 open to remove a ground from the conductor 51 which is now grounded only through contacts K313.

Responsive to the dialing by the calling subscriber, a sequence switch, such as switch SW3 is stepped in any well known manner. In addition, the billing information which is dialed by the calling subscriber (such as the called number, for example) is entered into a means for storing this information in data processing equipment such as a data store circuit S10. The construction of the data storage circuit S10 is not material to the invention—it may be any well known device. As long as the contacts K291 as closed, the data remains in storage at S10. When the contacts K291 open, the data is removed from storage.

The calling subscriber dials a PPCS access code, a class of call digit, a party identity digit (if required), the called number, and the final class digit. In the embodiment of FIG. 3 this comprises 13 digits. Accordingly, the sequence switch SW3, which steps responsive to each train of dial pulses, is positioned on its thirteenth step at this time. When this sequence switch SW3 reaches its thirteenth step, a ground is placed on conductor 52 by the wiper of level A. During the call, the hold relay K310 is operated and this ground has no effect because the contacts K312 are open.

When the call is completed and the connections are dropped, the hold relay K310 returns to normal. It should be noted that the auxiliary hold relay K290 remains operated over a circuit that extends from ground through the off-normal contacts ON3 on sequence switch SW3 through the coil of relay K290 to battery.

If the call was either a credit card or a third number call, or if the calling subscriber delayed too long before dialing the final class digit, then, relay K270 will have been operated as explained in conjunction with FIG. 2. Relay K270 locks up over contacts K271 and K291 and remains operated as long as relay K290 remains operated.

Means (such as relay K330) are provided in register-sender-translator 14 for indicating that the temporray recorder 28 is busy. It may be either recording, rewinding, or playing back. For example, an operating ground is applied from recorder 28 to relay K330 in any well known manner when the recorder 28 is busy. This causes contacts K332 to open a start circuit and thereby disable the common recorder and the billing memo printer.

Means in the register-sender ticketer 14 (such as dual winding relay K340) are provided for indicating when an idle common recorder has been found.

Means such as relay K350 are provided in each common recorder and printer for indicating that the common recorder and printer are busy. This means prevents seizure by a register-sender-ticketer which might be hunting for a common recorder and printer.

Means (such as relay K360 in common recorder and printer 31) are provided for starting the common recorder and printer 31*a* and 31*b* respectively.

At the end of a call, when the hold relay K310 returns to normal while relay K290 is held operated from off-normal contacts ON3, a common recorder start circuit is completed from ground through position 13 on level A of switch SW3, conductor 52, contacts K272, K312, conductor 53, contacts K332, K344*b*, conductor 54, contacts K351, and the coil of relay K360 to battery. This operates relay K360. If the temporary recorder 28 is busy at this time (for example, if it is rewinding) relay K330 is operated and preventing the extension of the ground on conductor 53 to start the common recorder and printer 31. Normally open contacts K331 are closed to ground conductor 51 to prevent the seizure of a common recorder.

If the common recorder and printer 31 are not busy (as indicated by the unoperated condition of relay K350) when a ground appears on conductor 54, the searching register-sender-ticketer 14 seizes the printer. In greater detail, responsive to the operation of relay K360, ground is extended from normally closed contacts K371 on relay K370, contacts K362, and through the winding of relay K360 to hold it operated. This relay K370 operates at the completion of printing to unlock relay K360. Contacts K361 close to operate relay K350 and consequently to open contacts K351 thus placing relay K360 under the control of relay K370. Contacts K363 close to complete a circuit that extends from battery through the winding of the stepping magnet M32 on switch 32 though the magnet controlled contacts 32*a*, conductor 56, and contacts K363 to the wiper of level E of switch 32. Also, contacts K364 close to complete a path that extends from battery through the coil of magnet M32, contacts 32*a*, conductor 56, contacts K364, and the coil of relay K380 to ground. Relay K380 is used to mark the common recorder 31 busy when it has been joined with register-sender-ticketer 14.

The conductors like 51 from the other register-sender-ticketers (not shown) that are connected to the contact banks of level E of switch 32 are grounded. The conductor 51 is not grounded from the register-sender-ticketer 14, that is searching for a common recorder.

Responsive to the ground on these conductors switch 32 steps when magnet M32 is energized over the circuit that extends from battery, through its winding, contacts 32*a*, conductor 56, contacts K363 of wiper of level E and the ground potentials on the contact banks. Magnet M32 is energized each time that its contacts 32*a* open for stepping the switch 32. Relay K380 does not operate when the switch is stepping because ground appears on both sides of its coil (the ground on level E, contacts K363, K364, and the winding K380 to ground).

When the wiper at level E reaches an ungrounded terminals the switch 32 stops stepping because magnet 32 can not reoperate. Relay K380 now operates from the battery connected to the winding of magnet M32 and appearing on conductor 56. Due to the resistance of the coil of relay K380, there is insufficient current to energize magnet M2 over this circuit.

When switch 32 is stepped to a set of terminals which are connected to the register-sender-ticketer 14, the tip and ring leads T and R of the common recorder 31*a* are connected to the tip and ring leads T and R of the temporary recorder 28 through contacts K341, K342 and levels A and B of the switch 32.

In greater detail, relay K340 is operated over a circuit that extends from ground through normally open contacts K381 (now operated to their closed position), conductor 57, the wiper of level C of switch 32, the contact banks of level C, conductor 58, and the upper coil of relay K340 to battery.

Ground for starting the common recorder 31*a* is extended from lead 53, through contacts K332, K344*a*, and level D of switch 32 to the start lead ST of recorder 31*a*. This ground also operates relay K390 in the temporary recorder 28 to start it to playing back. The circuit for the operation of relay K390 extends over conductor 59 and through contacts K343.

During the playback operation, cam 1 moves causing contact C1 to close for locking ground to relay K390. This ground also extends over conductor 59 to lock relay K340 operated.

Means are provided for connecting the printer 31*b* to the data store circuit S10 in the register-sender-ticketer 14 for transferring the billing information registered in the store to the printer. The object of this transfer is to print a billing memo. In greater detail, responsive to the operation of relay K380, contacts K382 close to complete an operating circuit to relay K395 that extends from ground through interrupter contacts M4*a* of printer switch SW4, contacts K382 and the coil of drive relay K395 to battery.

Responsive to the operation of relay K395, contacts K396 close to complete a circuit that extends from printer 31*b* through switch SW4, contacts K396 to the wiper of level F of switch 32. The contact banks of level F of switch 32 are connected to the wiper of level B of sequence switch SW3. As described previously, the sequence switch SW3 is now at its thirteenth position. In this position, the contact terminals of level B of switch SW3, are connected to read-out the data in the store S10. This is the data about the billing information of the call. Also responsive to the operation of relay K395, contacts K397 close to extend a switch stepping ground through level G of switch 32, and through the winding of magnet M3 of switch SW3 to battery. At the same time, contacts K398 close to extend a stepping ground through the coil of magnet M4 of switch SW4 to battery.

Responsive to the energization of magnet M4 of switch SW4, interrupter contacts M4*a* open to step switch SW4 and to break the operating circuit of relay K395. Responsive to the removal of the stepping ground from the magnet M3 of switch SW3, switch SW3 steps. Each time switch SW3 steps to a new position some of the information stored in the data store S10 is transferred over the previously traced circuit to operate the printer.

Means may be provided for rerecording the temporary voice recording transferring the stored data information, and printing an additional billing memo. Ths may be done even if the final class digit is transmitted within the allotted time period on person-to-person collect calls. In greater detail, contacts K222 are provided on relay K220 to extend the ground on conductor 52 to conductor 53—even when relay K270 is not operated. As switch SW3 steps through its entire operating cycle, all of its stored information is transferred to printer 31*b*. During this transfer of stored information, the temporary recorder 28 is also transferring its voice recording over conductors T, R into the common recorder 31*a* through a circuit already traced.

Means are provided for returning the entire circuitry to normal after the billing information is transferred to equipment 31. In greater detail, when switch SW3 is stepped back to its normal position, cam 3 allows off-normal contacts ON3 to return to their normal position and remove the ground that has been holding the relay K290 operated. Responsive to the release of relay K290, contacts K291 open to remove the locking ground from relay K270.

When the temporary recorder 28 is finished playing back the temporary voice recording, cam 1 in the temporary recorder removes the holding ground from play back control relay K390. Accordingly, this relay returns to its unoperated position. Under the control of circuitry (not shown) the temporary recorder 28 is rewound, and its tape is erased to be ready to receive another voice recording during the next call. The same ground which was holding relay K390 was also extended over conductor 59 to hold relay K340 in an operated condition. When this ground is removed, relay K340 returns to normal opening the contacts K341, K342 to break the tip and ring T and R connection between the recorders 28 and 31*a*.

When the billing memo is completely printed, relay K370 operates to remove the ground that was extended through contacts K371 and K362 to hold relay K360 operated. Accordingly, relay K360 returns to normal. Responsive thereto, contacts K361 open to return relay K350 to normal. Relay 380 is returned to normal because contacts K364 open. Also contacts K292 close so that switch 32 steps when relay K360 next operates. Thus, operating battery is removed from relay K380. Since relay K380 is returned to normal, the relay K395 also returns to normal and the operating circuit for switch SW4 is open. The common recorder and printer 31 is then in condition for being seized by the next call requiring this common equipment.

While the principles of the invention have been described above in connection with specific apparatus and applications, it is to be understood that this description is made only by way of example and not as a limitation on the scope of the invention.

We claim:

1. An automatic toll ticketing telephone system for extending toll calls between calling and called subscriber lines under the control of a calling subscriber comprising a first recorder for temporarily storing voice recordings, a second recorder for permanently storing voice recordings, means comprising said first recorder for making a temporary voice recording of an initial portion of at least some of the toll calls extended through said system, means for detecting those of said calls during which said toll ticketing system receives questionable billing information from the calling subscriber, means for transferring the temporary voice recording relative to a questionable call from said first recorder into permanent storage in said second recorder, means for providing a special billing memo of each call for which said voice recordings are transferred from said first to said second recorder, and means for correlating said billing means with said transferred voice recorder.

2. The system of claim 1 and means whereby said temporary recording is transferred into said second recorder if the calling subscriber fails to take prescribed action within a predetermined period of time.

3. The system of claim 1 and timer means for measuring a period of time occurring after a given event encountered during the establishment of a toll call, means responsive to said timer for releasing said call after said period of time if a second event has not yet occurred, and means for manually selecting the duration of said period of time.

4. The system of claim 3 and means controlled by said timer for causing said transfer of said voice recording from said first to second recorders.

5. An automatic toll ticketing system comprising a plurality of registers for recording billing data necessary to make a toll ticket, first audio recorder means individual to each of said registers for temporarily recording voice signals that occur while a PPCS call is being completed, second audio recorder means common to said registers for making a permanent audio recording of the signals recorded in said first audio recording means, access switch means for connecting said second recorder to one of said registers responsive to a hunt signal from said recorder, means in said one of said registers for connecting said first audio recorder to said second audio recorder after release of the call, and means for causing the first audio recorder to play back and the second audio recorder to record the signal recorded in said first audio recorder.

6. The automatic toll ticketing system of claim 5 comprising first detecting means for detecting station-to-station prepaid calls and means operated responsive to said detection for preventing said first and second audio recorders from operating.

7. The automatic toll ticketing system of claim 5 including second detecting means for detecting person-to-person collect calls and means responsive to the operation of said second detecting means for operating said audio recorder means.

8. The automatic toll ticketing system of claim 7 including third means for detecting credit card and third number calls, means responsive to the operation of said third detection means for operating said audio recorder means.

9. The automatic toll ticketing system of claim 5 including means in said register for digitally storing billing information and printer means associated with said second recorder and operated simultaneously with said second audio recorder for printing an additional billing memo responsive to said stored billing information.

References Cited

UNITED STATES PATENTS

| | | | |
|---|---|---|---|
| 3,028,454 | 4/1962 | Von Kohorn | 179—100.2 |
| 3,175,039 | 3/1965 | Willbourn | 179—6 |

KATHLEEN H. CLAFFY, *Primary Examiner.*